US012801491B2

(12) United States Patent
Rhinehart et al.

(10) Patent No.: US 12,801,491 B2
(45) Date of Patent: Nov. 17, 2026

(54) SYSTEMS AND METHODS FOR RELATIVE POSITIONING OF MEMORY STRUCTURES IN SYSTEM MEMORY MAP

(71) Applicant: Dell Products L.P., Round Rock, TX (US)

(72) Inventors: Aaron Rhinehart, Georgetown, TX (US); Andrew Corsini, Somerset, MA (US); Scott Whalen, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/800,645

(22) Filed: Aug. 12, 2024

(65) Prior Publication Data

US 2026/0044412 A1 Feb. 12, 2026

(51) Int. Cl.
*G06F 11/10* (2006.01)

(52) U.S. Cl.
CPC ........ *G06F 11/106* (2013.01); *G06F 11/1068* (2013.01)

(58) Field of Classification Search
None
See application file for complete search history.

(56) References Cited

U.S. PATENT DOCUMENTS

2014/0201432 A1* 7/2014 Nemazie ............ G06F 12/0246 711/103

OTHER PUBLICATIONS

Andy Rudoff, Persistent Memory Programming (Year: 2017).*

* cited by examiner

*Primary Examiner* — Guerrier Merant
(74) *Attorney, Agent, or Firm* — Jackson Walker L.L.P.

(57) ABSTRACT

An information handling system may include a processor, a persistent memory, and a basic input/output system communicatively coupled to the processor and configured to write to a metadata region stored on the persistent memory a floating memory offset value to describe a memory region of the persistent memory as a relative location within a system memory map for the information handling system.

15 Claims, 1 Drawing Sheet

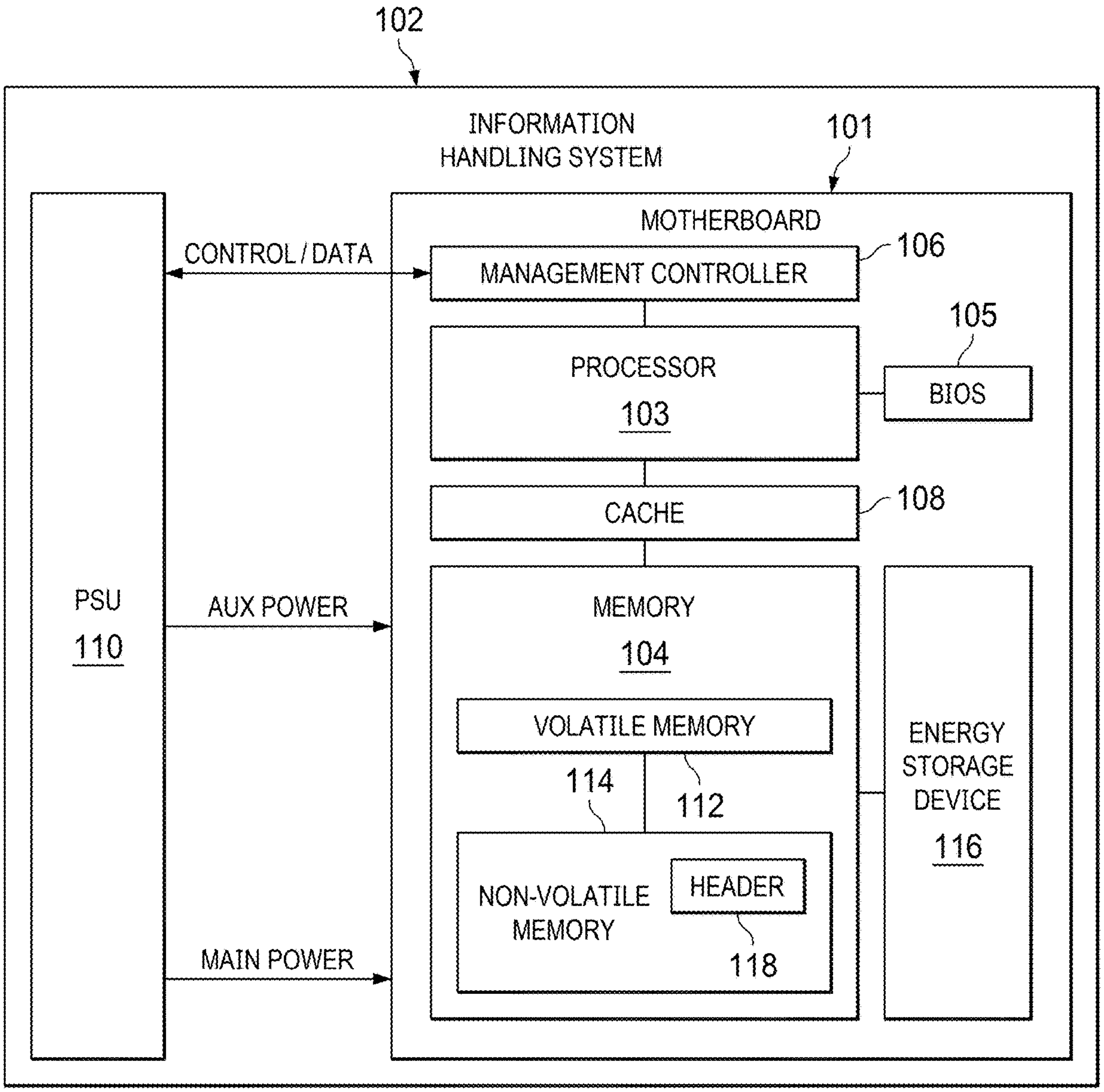
102
INFORMATION HANDLING SYSTEM
101
MOTHERBOARD
CONTROL / DATA
MANAGEMENT CONTROLLER
106
105
PROCESSOR
103
BIOS
CACHE
108
PSU
110
AUX POWER
MEMORY
104
VOLATILE MEMORY
114
112
ENERGY STORAGE DEVICE
116
NON-VOLATILE MEMORY
HEADER
118
MAIN POWER

SYSTEMS AND METHODS FOR RELATIVE POSITIONING OF MEMORY STRUCTURES IN SYSTEM MEMORY MAP

TECHNICAL FIELD

The present disclosure relates in general to information handling systems, and more particularly to systems and methods for relative positioning of memory structures in a memory map of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are increasingly using persistent memory technologies such as Non-Volatile Dual In-line Memory Modules (NVDIMMs). An NVDIMM is a memory module that may retain data even when electrical power is removed either from an unexpected power loss, system crash or from a normal system shutdown. To enable such functionality, an NVDIMM may include a traditional dynamic random access memory (DRAM) which may store data during normal operation when electrical power is available from a power supply unit and a flash memory to back up data present in the DRAM when a loss of electrical power from the power supply unit occurs. A battery, capacitor, or other energy storage device either internal or external to the NVDIMM may supply electrical energy for a “save” or “vault” operation to transfer data from the DRAM to the flash memory in response to a power loss event from the power supply unit.

Current persistent memory solutions including NVDIMM-N, Intel’s Optane DC Persistent Memory (DCPMM), and software defined persistent memory (SDPM), require the memory map of the information handling system to be consistent between boots for the persistent memory and associated namespaces to be presented to the operating at boot time. If the memory map changes for any reason between boots, the persistent memory can no longer be mapped to the prescribed memory region, and the persistent memory feature with its associated data is not available at boot. Memory map changes can result from adding more memory to the server (field upgrade or unhiding shadow memory), removing memory from the server, DIMM failure, or DIMM map out to create a balanced configuration. Current persistent memory implementations require either restoration of the memory map to the original configuration or performing a persistent memory sanitize resulting in data loss to restore the persistent memory to health.

SUMMARY

In accordance with the teachings of the present disclosure, the disadvantages and problems associated with existing approaches to memory management in an information handling system comprising a persistent memory may be reduced or eliminated.

In accordance with embodiments of the present disclosure, an information handling system may include a processor, a persistent memory, and a basic input/output system communicatively coupled to the processor and configured to write to a metadata region stored on the persistent memory a floating memory offset value to describe a memory region of the persistent memory as a relative location within a system memory map for the information handling system.

In accordance with these and other embodiments of the present disclosure, a method may include, in an information handling system comprising a persistent memory, writing to a metadata region stored on the persistent memory a floating memory offset value to describe a memory region of the persistent memory as a relative location within a system memory map for the information handling system.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, write to a metadata region stored on a persistent memory a floating memory offset value to describe a memory region of the persistent memory as a relative location within a system memory map for an information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein THE FIGURE illustrates a block diagram of an example information handling system, in accordance with embodiments of the present disclosure.

DETAILED DESCRIPTION

Preferred embodiments and their advantages are best understood by reference to THE FIGURE, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

THE FIGURE illustrates a block diagram of an example information handling system 102. As depicted, information handling system 102 may include a power supply unit (PSU) 110, a motherboard 101, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in THE FIGURE, motherboard 101 may include a processor 103, memory 104, a BIOS 105, a management controller 106, a processor cache 108, and an energy storage device 116, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. As shown in THE FIGURE, memory 104 may comprise a persistent memory that includes a volatile memory 112 (e.g., DRAM or other volatile random-access memory) and non-volatile memory 114 (e.g., flash memory or other non-volatile memory). During normal operation, when PSU 110 provides adequate power to components of information handling system 102, data written to memory 104 from processor 103 and/or cache 108 may be stored in volatile memory 112. However, in the event of loss of system input power or a power fault of PSU 110 that prevents delivery of electrical energy from PSU 110 to memory 104, data stored in volatile memory 112 may be transferred to non-volatile memory 114 in a save operation. After input power is restored, or a faulty PSU 110 is replaced, such that PSU 110 is again operable to provide electrical energy to information handling resources of information handling system 102, on the subsequent power-on of information handling system 102, data may be copied from the non-volatile memory 114 back to volatile memory 112 via a restore operation. The combined actions of data save and then data restore, allows the data to remain persistent through a power disruption. Although not explicitly shown in THE FIGURE, memory 104 may also include hardware, firmware, and/or software for carrying out save operations.

As shown in THE FIGURE, non-volatile memory 114 may include a header 118. Header 118 may comprise any suitable non-volatile storage media, and may be configured to store metadata regarding memory 104, including metadata relating to a memory map for information handling system 102. It is understood that header 118 including metadata information may be separate from persistent memory regions or virtual memory regions described by the metadata. For example, in some embodiments, non-volatile memory may include distinct and separate regions of memory, including: (1) a virtual persistent memory region residing in system memory (e.g., DRAM) described by the metadata of header 118, and (2) a persistent memory region (which may be a separate memory region) where the metadata describing the virtual persistent memory region resides.

BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102. In some embodiments, BIOS 105 may also be configured to optimize boot of information handling system 102 by dynamically determining energy requirements of memory 104 for performing a save operation, as described in greater detail below.

Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with a PSU 110 to communicate control and/or telemetry data between management controller 106 and PSU 110. For example, PSU 110 may communicate information regarding status and/or health of PSU 110 and/or measurements of electrical parameters (e.g., electrical currents or voltages) present within PSU 110. In some embodiments, management controller 106 may also be configured to manage charging of energy storage device 116 when processor 103 and other components of information handling system 102 are powered down, as described in greater detail below.

Cache 108 may comprise a memory used by processor 103 to reduce the average time to access data from main memory 104. Cache 108 may be a smaller, faster memory than memory 104 and may store copies of frequently-used data and instructions from memory 104. In some embodiments, cache 108 may comprise an independent data cache and instruction cache. In these and other embodiments, a cache may be organized in a hierarchy of multiple cache levels (e.g., level 1, level 2, etc.). All or part of cache 108 may be configured as a write-back cache, in which processor 103 writes may be stored in cache 108 without also writing the data to memory 104, until a subsequent action such as cache line invalidate or flush operation forces the data to be written back to memory 104. Thus in write-back cache, the most up-to-date copy of the data may only reside in the cache indefinitely. Some part of cache 108 may also be configured as a write-through cache, in which processor 103 writes are stored in cache but also immediately to memory 104 such that memory 104 has the most up-to-date copy of the data.

Generally speaking, PSU 110 may include any system, device, or apparatus configured to supply electrical current to one or more information handling resources of information handling system 102. As shown in THE FIGURE, PSU 110 may provide (a) a main power rail, indicated in THE FIGURE as "MAIN POWER," and (b) an auxiliary power rail, indicated in THE FIGURE as "AUX POWER." The main power rail may generally be used to provide power to information handling resources of information handling system 102 when information handling system 102 is turned on. On the other hand, the auxiliary power rail may generally be used to provide power to certain auxiliary information handling resources when energy is not supplied via the main power rail. For example, the auxiliary power rail may be used to provide power to management controller 106 when electrical energy is not provided to processor 103, memory 104, and/or other information handling resources via the main power rail.

Energy storage device 116 may comprise any system, device, or apparatus configured to store energy which may be used by memory 104 to perform save operations in response to a loss of an alternating current input source or other power fault of PSU 110. In some embodiments, energy storage device 116 may comprise a battery configured to convert stored chemical energy into electrical energy. In other embodiments, energy storage device 116 may comprise a capacitor or "supercap" configured to store electrical energy and deliver such electrical energy to memory 104 when needed to perform save operations (e.g., by closure of a switch to electrically couple such capacitor to components of memory 104). Although energy storage device 116 is shown in THE FIGURE as external to memory 104, in some embodiments energy storage device 116 may be integral to memory 104. In these and other embodiments, energy storage device 116 may be charged from PSU 110. In some embodiments, energy storage device 116 may be communicatively coupled to management controller 106 via a systems management interface such as, for example, Inter-Integrated Circuit (i2C), System Management Bus (SMBus) or Power Management Bus (PMBus), allowing management controller 106 to receive health and status (e.g., state of charge) from and/or communicate commands to energy storage device 116. In some embodiments, energy storage device 116 may provide energy to a plurality of persistent memory 104 devices.

In addition to motherboard 101, processor 103, memory 104, BIOS 105, management controller 106, cache 108, energy storage device 116, and PSU 110, information handling system 102 may include one or more other information handling resources. For example, in some embodiments, information handling system 102 may include more than one PSU 110 and/or more than one energy storage device 116.

In operation, BIOS 105 (or another suitable component of information handling system 102) may write to header 118 a floating memory offset value to describe the memory region of non-volatile memory 114 as a relative location (as opposed to a fixed address range) within the system memory map. For example, the floating memory offset value may describe an offset of the persistent memory region to the top of the system memory map. Such shifting of the persistent memory region in the memory map may be transparent to the user. BIOS 105 may represent the persistent memory region size, location and contained namespaces to an operating system and their location may change within system memory between boots with no operating system impact.

Further, BIOS 105 (or another suitable component of information handling system 102) may use one or more address range scrubbing (ARS) tables within non-volatile memory 114 to keep track of uncorrectable DIMM and data errors in the persistent space detected at run-time either by consumption of bad data at that location or found via patrol scrub. BIOS 105 may write ARS tables to non-volatile memory 114 each time an issue is encountered. In existing approaches, entries within ARS tables are associated with a specific memory address in such non-volatile memory 114.

However, in accordance with the present disclosure, BIOS 105 (or another suitable component of information handling system 102) may write entries to ARS tables to refer to an offset within the floating persistent memory region, wherein such entries will persist even after the system memory footprint has changed. This may allow the operating system to know where previously discovered errors in the data reside. Accordingly, when the system memory map changes, the ARS tables will correctly refer to affected memory locations as unhealthy until after a sanitize operation when the ARS tables are cleared.

The address range of any persistent memory installed in information handling system 102 changes if memory is added to or removed from information handling system 102. In existing persistent memory implementations, any changes in the memory configuration required sanitization of persistent memory before it could be used again resulting in the destruction of any data in that persistent memory space. In the present disclosure, the loss of data after a sanitize may be avoided by removing the requirement to sanitize after a change in the memory map because the persistent memory region will be available at the new relative floating location along with its associated namespaces.

When memory capacity in a system is reduced, the systems and methods described herein also account for memory capacity changes that reduce the total memory to less than the configured amount of persistent memory for a socket. If this occurs, BIOS 105 may log a restore failure error indicating that there is not enough system memory to support the current persistent memory configuration.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S. C. § 112(f) unless the words "means for" or "step for" are explicitly used in the particular claim.

What is claimed is:

1. An information handling system comprising:
a processor;
a persistent memory; and
a basic input/output system communicatively coupled to the processor and configured to:
during a first boot of the information handling system, write to a metadata region stored on the persistent memory a floating memory offset value to describe a memory region of the persistent memory as a relative location within a system memory map for the information handling system;
during a second boot of the information handling system, read the floating memory offset value from the metadata region on the persistent memory to locate the memory region of the persistent memory within an updated system memory map, wherein the updated system memory map differs from the system memory map during the first boot as a result of a change in a physical memory configuration of the information handling system; and
responsive to reading the floating memory offset value during the second boot, present the memory region of the persistent memory to an operating system without performing a sanitize operation on the persistent memory.

2. The information handling system of claim 1, wherein the metadata region is a header of the persistent memory.

3. The information handling system of claim 1, wherein the floating memory offset value describes an offset of the memory region of the persistent memory from the top of the system memory map.

4. The information handling system of claim 1, wherein the basic input/output system is configured to write entries to a table of the persistent memory wherein such entries refer to offsets within a floating memory offset region defined by the floating memory offset value that identify errors within the persistent memory.

5. The information handling system of claim 4, wherein the table comprises an address range scrubbing table.

6. A method comprising, in an information handling system comprising a persistent memory:

writing, by a basic input/output system during a first boot of the information handling system, to a metadata region stored on the persistent memory a floating memory offset value to describe a memory region of the persistent memory as a relative location within a system memory map for the information handling system;

reading, by the basic input/output system during a subsequent boot of the information handling system, the floating memory offset value from the metadata region on the persistent memory to locate the memory region of the persistent memory within an updated system memory map, wherein the updated system memory map differs from the system memory map during the first boot as a result of a change in a physical memory configuration of the information handling system; and presenting, by the basic input/output system, in response to reading the floating memory offset value during the subsequent boot, the memory region of the persistent memory to an operating system without performing a sanitize operation on the persistent memory.

7. The method of claim 6, wherein the metadata region is a header of the persistent memory.

8. The method of claim 6, wherein the floating memory offset value describes an offset of the memory region of the persistent memory from the top of the system memory map.

9. The method of claim 6, further comprising writing entries to a table of the persistent memory wherein such entries refer to offsets within a floating memory offset region defined by the floating memory offset value that identify errors within the persistent memory.

10. The method of claim 9, wherein the table comprises an address range scrubbing table.

11. An article of manufacture comprising:

a non-transitory computer-readable medium; and computer-executable instructions carried on the computer-readable medium, the instructions readable by a processor, the instructions, when read and executed, for causing the processor to:

write, during a first boot of an information handling system, to a metadata region stored on a persistent memory a floating memory offset value to describe a memory region of the persistent memory as a relative location within a system memory map for the information handling system;

read, during a second boot of the information handling system, the floating memory offset value from the metadata region on the persistent memory to locate the memory region of the persistent memory within an updated system memory map, wherein the updated system memory map differs from the system memory map during the first boot as a result of a change in a physical memory configuration of the information handling system; and present, responsive to reading the floating memory offset value during the second boot, the memory region of the persistent memory to an operating system without performing a sanitize operation on the persistent memory.

12. The article of claim 11, wherein the metadata region is a header of the persistent memory.

13. The article of claim 11, wherein the floating memory offset value describes an offset of the memory region of the persistent memory from the top of the system memory map.

14. The article of claim 11, the instructions for further causing the processor to write entries to a table of the persistent memory wherein such entries refer to offsets within a floating memory offset region defined by the floating memory offset value that identify errors within the persistent memory.

15. The article of claim 14, wherein the table comprises an address range scrubbing table.

* * * * *